United States Patent [19]

Jablonsky

[11] 4,012,993
[45] Mar. 22, 1977

[54] AUXILIARY POWER STEERING SYSTEM

[75] Inventor: Erich Jablonsky, Boebingen, Rems, Germany

[73] Assignee: Zahnradfabrik Friedrichshafen AG, Friedrichshafen, Germany

[22] Filed: Sept. 22, 1975

[21] Appl. No.: 615,169

Related U.S. Application Data

[63] Continuation-in-part of Ser. No. 357,603, May 7, 1973, Pat. No. 3,927,604, which is a continuation-in-part of Ser. No. 266,053, June 26, 1972, Pat. No. 3,855,904.

[30] Foreign Application Priority Data

Oct. 12, 1974   Germany ........................ 2448702

[52] U.S. Cl. ............................. 91/371; 91/375 A
[51] Int. Cl.² ........................................... F15B 9/10
[58] Field of Search ............ 91/371, 372, 373, 370, 91/434, 375 A

[56] References Cited

UNITED STATES PATENTS

| | | | |
|---|---|---|---|
| 2,930,361 | 3/1960 | MacDuff | 91/371 |
| 3,855,904 | 12/1974 | Jablonsky | 91/372 |
| 3,927,604 | 12/1975 | Jablonsky | 91/371 |

*Primary Examiner*—Paul E. Maslousky
*Attorney, Agent, or Firm*—Zalkind & Shuster

[57] ABSTRACT

A fluid power steering system for motor vehicles in which a reaction force is generated to resist manual movement of a control valve piston through which pressurized fluid is supplied to a servomotor. The reaction force is limited by displacement of force limiting valve pistons in response to excessive pressure in reaction chambers. When displaced from its normal position, a force limiting valve sequentially blocks supply of pressurized fluid to one of the reaction chambers and then relieves the pressure in said chamber.

6 Claims, 2 Drawing Figures

AUXILIARY POWER STEERING SYSTEM

This application is a continuation-in-part of my prior co-pending U.S. application Ser. No. 357,603, filed May 7, 1973, now U.S. Pat. No. 3,927,604, which is in turn, a continuation-in-part of my prior co-pending application Ser. No. 266,053, filed June 26, 1972, now U.S. Pat. No. 3,855,904.

BACKGROUND OF THE INVENTION

This invention relates to auxiliary fluid power steering systems for motor vehicles having reaction force generating means.

Motor vehicles are often provided with a single hydraulic pressure generating unit supplying pressurized fluid to several independent fluid pressure operated systems such as power steering and braking systems, or systems for regulation of a suspension level that require a variable volumetric supply of fluid. In order to maintain the hydraulic pressure generating unit relatively small in dimension despite the different fluid pressure operated devices serviced thereby, pressure storage facilities is provided in order to store fluid under pressure during periods of low fluid consumption. Accordingly, a relatively high storage pressure is maintained which is about twice as high as the highest operating pressure required for normal steering purposes in the fluid power steering system. The fluid power steering system is therefore constructed in such a way as to block flow from the high pressure source to the fluid reservoir in the neutral position of the steering wheel.

Auxiliary power steering systems of the foregoing type as disclosed in U.S. application Ser. No. 357,603, filed May 7, 1973, aforementioned includes two control valve pistons and two reaction pistons, each pair being axially aligned in symmetrical relationship to the valve actuators driven by the hand steering wheel. In the deflected positions of the hand steering wheel, pressurized fluid is fed to one of the operating chambers of a servomotor while the other operating chamber is connected to the low pressure reservoir. The reaction pistons function to resist movement of the hand steering wheel with a proportional reaction force by supply of operating pressure thereto from the servomotor. The reaction pistons are arranged, however, to enable the reaction force to rise no further than a certain maximum value by use of a coaxial force limiting piston acted upon by the storage pressure of the pressurized source. In the foregoing type of reaction force limiting arrangement, the reaction force limiting function is accomplished hydraulically only. However, in order to obtain sufficiently large reaction forces at the hand steering wheel, the reaction and force limiting pistons must have relatively large diameters. In utilizing large diameter pistons, jamming often occurs because of piston guide defects. Further, a relatively large sealing surface is associated with large diameter pistons which is a serious disadvantage in connection with the force limiting pistons. In another type of reaction force limiting arrangement as disclosed in my prior U.S. Pat. No. 3,855,904 aforementioned, a pre-stressed spring is utilized to determine the maximum level of reaction force that must be overcome by the driver on the hand steering wheel. The latter type of reaction force control arrangement also involves a relatively expensive construction.

It is therefore an important object of the present invention to provide a reaction force limiting arrangement for fluid power steering systems associated with a fluid pressure storage supply which will insure faultless behavior during operation by apparatus of relatively small spatial dimension.

SUMMARY OF THE INVENTION

In accordance with the present invention, a reaction force resisting movement of the steering wheel by the driver is generated by supply of fluid under operating pressure to a pair of reaction chambers opposing movement of a reaction piston engaged with the steering spindle. The reaction piston is provided with a pair of ported guide sleeves slidably mounting a pair of force limiting valve pistons, the end surfaces of which are exposed to the pressurized fluid within the reaction chambers. The fluid connection between the high storage pressure source and the reaction chambers is established through the force limiting piston valves in their normal positions to which they are biased by a spring. When the pressure within a reaction chamber becomes excessive, the force limiting piston valve is displaced from its normal position to sequentially block further flow of operating pressure to the reaction chamber and then relieve the pressure within the reaction chamber by connecting it to the low pressure reservoir.

BRIEF DESCRIPTION OF THE DRAWING FIGURES

DETAILED DESCRIPTION OF PREFERRED EMBODIMENT

Figure 1:
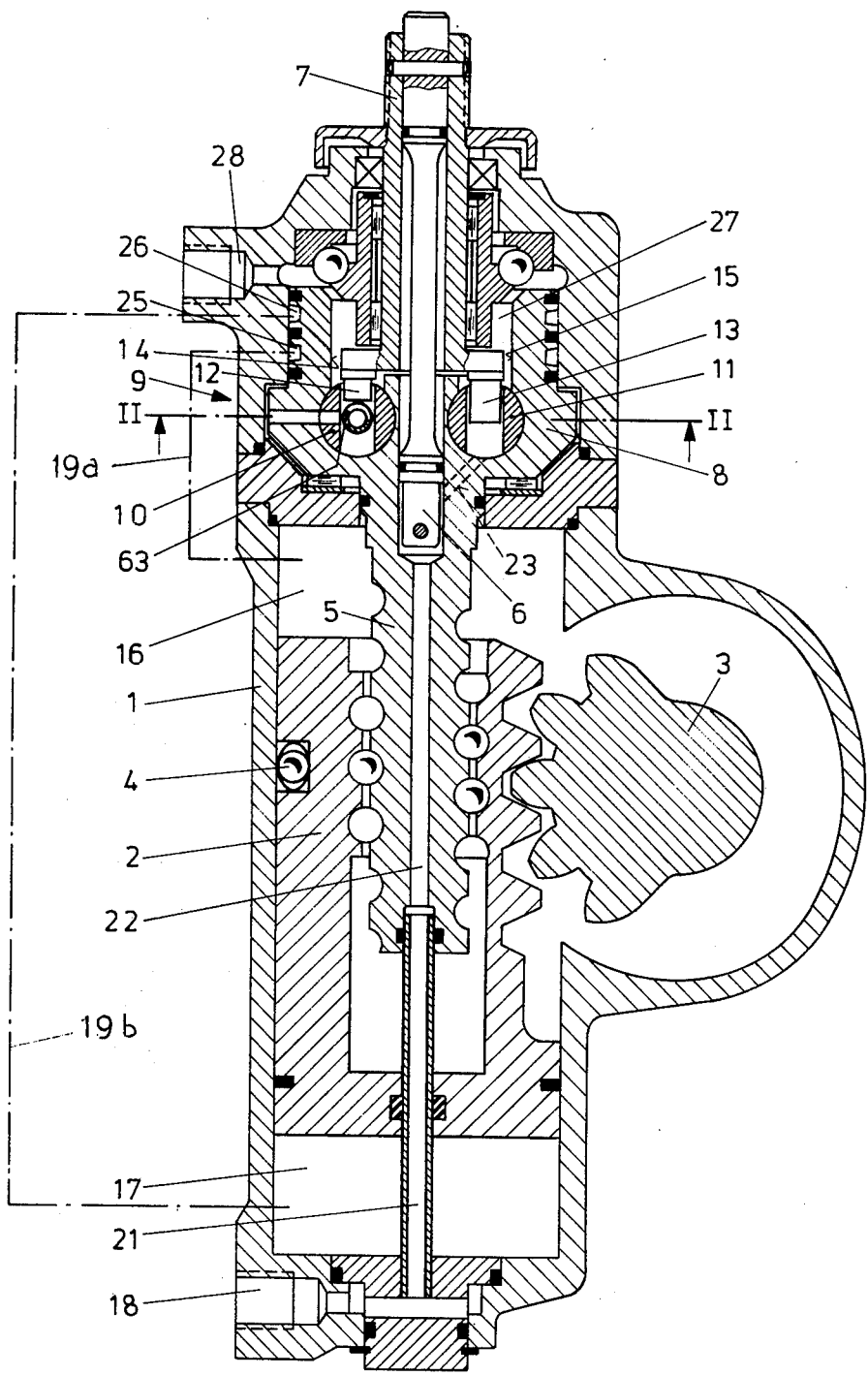
FIG. 1 is a longitudinal section view through an auxiliary fluid power steering device constructed in accordance with the present invention.

Referring now to the drawings in detail, FIG. 1 depicts an operating servomotor piston 2 internally threaded to act as a steering nut. The piston 2 is axially movable within a steering gear housing 1 which constitutes the servomotor cylinder for the vehicle steering system. Rack teeth formed externally on the operating piston 2 are in meshing engagement with the sector gear teeth of a driven shaft 3 while the internal threads of the operating piston are in operative meshing engagement with an externally threaded spindle 5 by means of recirculating ball race elements 4. The threaded spindle 5 is connected to a steering spindle 7 by means of a torsion bar 6. A hand steering wheel (not shown) is adapted to be connected to the steering spindle 7.

With continued reference to FIG. 1, a steering control assembly 9 is shown having a reaction piston 10 that extends axially in transverse relation to the rotational axis of the spindle 7. The reaction piston 10 is disposed on one side of the spindle axis opposite the side on which a control valve piston 11 is disposed with its axis also extending transversely of the spindle axis in parallel spaced relation to the reaction piston 10. The reaction and control pistons are displaceable along their axes within cavities formed in a valve body 8 through which the threaded spindle 5 extends. Valve actuating pegs 12 and 13 of unequal length project from one end of the steering spindle 7 through bores 14 and 15 formed in the valve body 8 and respectively engage the reaction piston 10 and control piston 11. In this manner, rotational movement imparted to the spindle 7 will impart axial displacement to the reaction and control pistons in opposite directions. Rotational movement of the spindle 7 will be resisted by the elastic torsion bar 6 until pressurized fluid is supplied to the operating piston 2 in response to displacement of the control piston 11 as will be explained in detail hereafter. It will be appreciated, however, that the steering operation may be continued mechanically in the event of fluid pressure failure in which case the pegs 12 and 13 will directly drive the steering spindle 5 after overcoming a control clearance 5" (FIG. 2), which is limited by the bores 14 and 15 in the valve body 8. The reaction and control pistons when displaced from a neutral position by the hand steering wheel through the spindle 7 are continuously urged to return to the neutral positions by the torsional bias of the torsion bar 6.

The valve actuating pegs 12 and 13 engage the reaction and control pistons positively and can be displaced by the spindle 7 within a clearance distance. When engaged by the valve actuating pegs, the pistons 10 and 11 are displaceable in opposite directions within the valve body 8 to respectively control the supply of pressurized fluid to the operating piston 2 and generate a reaction force opposing the hand wheel turning force. The operating piston 2 divides the steering gear housing 1 into two pressure chambers 16 and 17 as shown in FIG. 1. Pressurized fluid is supplied to the fluid control assembly 9 through an inlet fitting 18 formed at one axial end of the steering gear housing 1 remote from the fluid control assembly. The inlet fitting 18 is in fluid communication with a conduit 21 that extends coaxially through the operating piston 2. The conduit 21 is axially fixed to the threaded spindle 5 and establishes fluid communication with the axial bore therein through which fluid flows into fluid passage 23 shown by dotted line leading to supply channels that are hydraulically connected under control of the control piston 11 with annular grooves 25 and 26 formed externally on the valve body 8 as shown in FIG. 1, said grooves being hydraulically connected with the pressure chambers 16 and 17 by fluid lines 19A and 19B as shown by dot-dash line in FIG. 1. The annular grooves 25 and 26 can also be hydraulically connected with a return chamber 27 formed within the valve body 8, the return chamber 27 being in fluid communication with a low pressure reservoir through the outlet fitting 28 at an axial end of the housing 1 opposite the end to which the inlet fitting 18 is connected.

Figure 2:
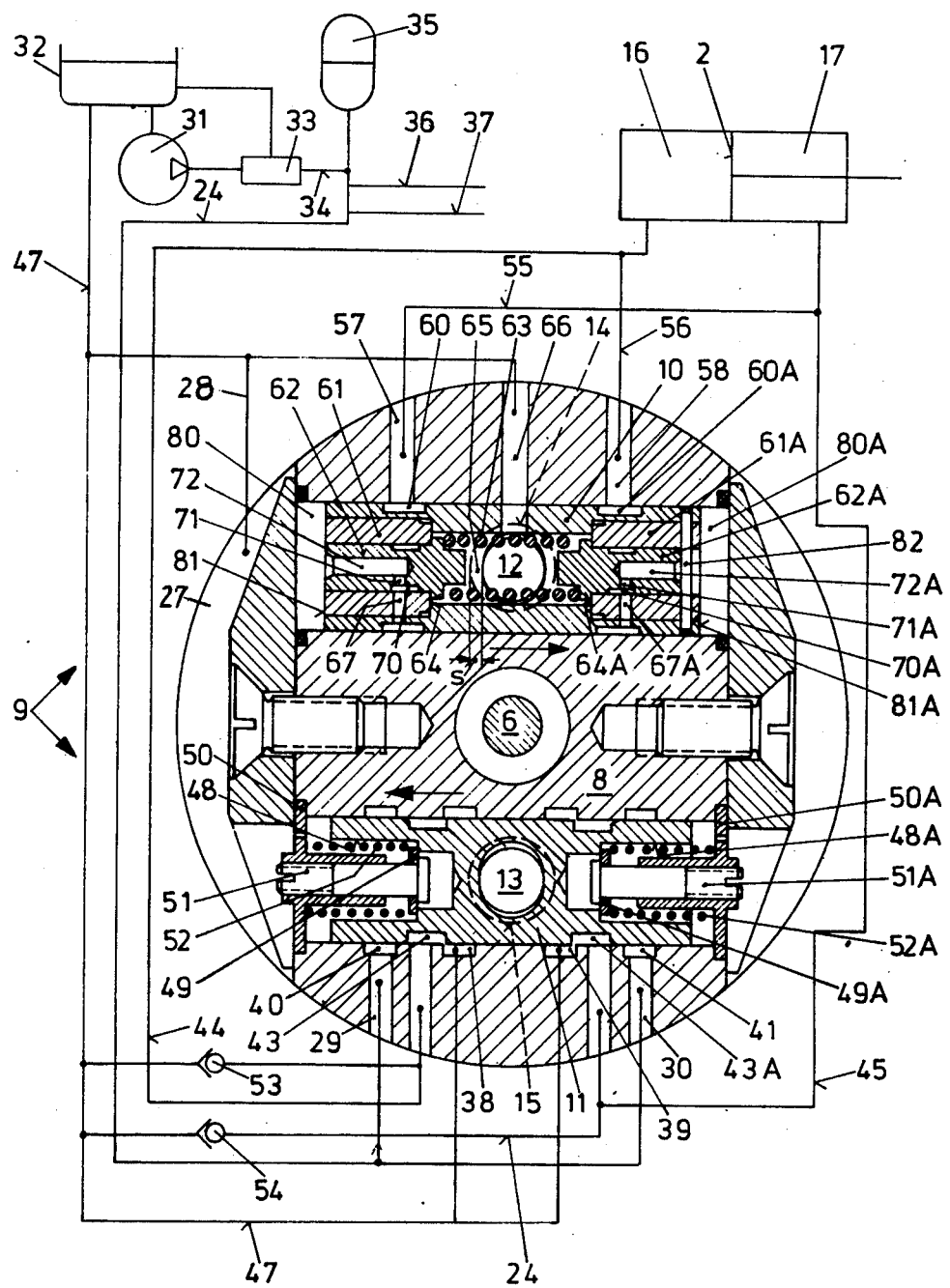
FIG. 2 is a combined fluid circuit diagram and transverse section view taken substantially through a plane indicated by section line II—II in FIG. 1.

As schematically shown in FIG. 2, the fluid power steering system with which the fluid control assembly 9 is associated includes an engine driven pump 31 drawing pressurized fluid such as oil from a low pressure reservoir tank 32. Fluid from the outlet of the pump is displaced through a storage loading valve 33 connected by conduit 34 to a pressure storage accumulator 35. Fluid under a storage pressure is accordingly supplied through conduits 36 and 37 to various fluid pressure operated devices such as the vehicle brakes and the system for regulation the level of suspension. Storage pressure fluid is simultaneously supplied through conduit 24 to supply channels 29 and 30 from the inlet fitting 18 aforementioned through the fluid flow path as hereinbefore described in connection with FIG. 1. These supply channels terminate at annular channels 40 and 41 formed in the valve body 8 about the control piston 11 and cooperate with annular grooves 43 and 43A formed externally on the control piston. The annular grooves 43 and 43A respectively communicate through lines 44 and 45 with the servomotor pressure chambers 16 and 17. In the neutral position of the control piston 11 as shown in FIG. 2, flow from the annular channels 40 and 41 is blocked so that no flow of pressurized fluid is possible as long as there is no steering movement of the hand steering wheel. Further, in the neutral position of the control piston 11 the annular grooves 43 and 43A communicate through annular channels 38 and 39 in the valve body 8 with the reservoir tank 32 through conduit 47.

The control piston 11 is formed at opposite axial ends with bores 48 and 48A into which adjusting screws 51 and 51A extend. The adjusting screws are supported by covers 50 and 50A fixed to the valve body. Centering springs 52 and 52A are supported within the bores 48 and 48A under a prestress and react against the covers and discs 49 and 49A held in axially adjusted positions by means of the adjusting screws 51 and 51A. The centering spring arrangement thus functions to establish a precise centering bias for the control piston in its neutral position as well as to enhance the function of the torsion bar 6 in returning the control piston to its neutral position.

As hereinbefore described, fluid under a storage pressure will be supplied to one of the pressure chambers 16 and 17 through line 44 or 45 in response to axial displacement of the control piston 11. In order to increase the rate at which the pressure chambers are filled with fluid, suction valves 53 and 54 are interconnected between the return line 47 and the lines 44 and respectively connected to the pressure chambers 16 and 17.

The reaction piston 10 in its neutral position as shown in FIG. 2, has a pair of annular grooves 60 and 60A aligned with channels 57 and 58, respectively, said channels 57 and 58 being connected by lines 55 and 56 to the conduits 44 and 45 that extend to the pressure chambers of the servomotor. Opposite axial ends of the reaction piston 10 have guide sleeves 61 and 61A inserted therein. The guide sleeves slidably mount force limiting pistons 62 and 62A. A spring 63 is positioned within a spring chamber 65 formed in the reaction piston and abuts flanges 64 and 64A formed on the force limiting pistons 62 and 62A. The spring chamber is connected by means of channel 66 to the low pressure line 47. The spring 63 biases the force limiting pistons outwardly to the positions shown in which the flanges 64 and 64A abut the inner axial ends of the guide sleeves 61 and 61A. Transverse bores 67 and 67A formed in the guide sleeves establish fluid communication through annular grooves 70 and 70A and passages 71 and 71A with axial bores 72 and 72A formed within the pistons 62 and 62A for fluid communication with reaction chambers 80 and 80A. Thus, fluid communication is established between the pressure chambers 16 and 17 of the servomotor and the reaction chambers 80 and 80A at opposite axial ends of the reaction piston 10. An axial end surface 81 on the reaction piston is exposed to the pressurized fluid in reaction chamber 80 while the opposite end surface 81A of the reaction piston is exposed to the pressurized fluid in reaction chamber 80A. Accordingly, the same operating pressures applied to the servomotor chambers through lines 44 and 45, will be applied to the reaction chambers 80 and 80A. The guide sleeve 61A is connected by means of transverse pin 82 to the body of the reaction piston to hold piston 62A assembled therein. By removal of the pin 82 the force limiting piston 62A may be removed for replacement of the spring 63 which determines the maximum reaction force generated.

During normal operation of the auxiliary power steering system, movement imparted to the steering spindle 7 is transmitted by means of the valve actuating pegs 12 and 13 to the reaction piston 10 and control piston 11 in opposite directions as denoted by arrows in FIG. 2. When displaced beyond a minimum amount exceeding the control clearance s, a fluid pressure force is developed which is much greater than the manual turning force applied because of the pressurized fluid supplied to the servomotor operating piston 2. When the control piston 11 is shifted, for example in a left hand direction against the bias of centering spring 52, line 24 supplied fluid under storage pressure to the annular channel 40 then in fluid communication with the annular groove 43 establishing fluid communication with line 44 to conduct pressurized fluid to pressure chamber 16 for expansion thereof. The servomotor piston 2 accordingly moves in a right hand direction displacing fluid from pressure chamber 17. The fluid in contracting chamber 17 is conducted by line 45, annular groove 43 in the control piston which is then in fluid communication with annular channel 39, and line 47 to the low pressure reservoir 32. During the foregoing steering operation, the operating pressure prevailing in pressure chamber 16 communicates with angular groove 60A of the reaction piston through the branch lines 56. Fluid under operating pressure is thereby conducted through passage 67A, passage 71A and axial bore 72A to the reaction chamber 80A. Thw operating pressure in reaction chamber 80A is applied to pressure face 81A to bias the reaction piston in a left hand direction opposing movement being imparted to the reaction piston in a right hand direction by manual turning of the steering wheel. The opposing bias of the operating pressure in reaction chamber 80A constitutes a proportional reaction force that must be overcome by the driver and simulates the so-called steering sense felt by the driver as a result of road contact when utilizing conventional manual steering systems.

Since the normal range of steering movement imparted to the vehicle wheels is approximately ⅓ of the total turning movement of the steering wheel, the increase in reaction force produced should be limited to the steering range. Also, during parking maneuvers, the increase in the reaction force should be limited. Toward this end, the reaction force is limited to a maximum value in accordance with the present invention. When a predetermined operating pressure level is attained within reaction chamber 80A, the bias of spring 63 is overcome by the pressure force acting on the end of force limiting piston 62A causing the piston to move in a left hand direction as viewed in FIG. 2. As a result of such displacement of the piston 62A, angular groove 70A is moved out of alignment with passage 67A to cut off flow of pressurized fluid to the reaction chamber 80A. If any rise in pressure within the reaction chamber continues because of leakage, piston 62A moves further in a left hand direction until angular groove 70A establishes fluid communication between the reaction chamber and the spring chamber 65 through passage 71A and bore 72A. The reaction chamber 80A will then be connected for a short period of time with the low pressure reservoir 32 through channel 66 and line 47 in order to reduce any excess pressure. The reaction force developed is thereby limited to a maximum value.

By turning the steering wheel and steering spindle 7 in the opposite direction, a reaction force is developed by the operating pressure conducted to reaction chamber 80 and this reaction force is limited to a maximum value as hereinbefore described in connection with reaction chamber 80A. While the reaction chamber 80 is being pressurized to develop the reaction force during left hand movement of the reaction piston 10 as viewed in FIG. 2, the pressure in pressure chamber 16 is relieved by means of line 44, angular grooves 43 and 38 and return line 47 connected to the low pressure reservoir 32.

I claim:

1. In combination with a source of pressurized fluid for a vehicle having a pump (31), a low pressure fluid reservoir (32) and an accumulator (35) within which a high storage pressure is developed and a manually operable auxiliary power steering system having a servomotor (2) displaceable under control of a steering spindle (7) engageable with a control valve assembly (11) which is displaceable, against the bias of centering spring means (48 and 48A) from a neutral position in which flow of pressurized fluid from the source to the servomotor is blocked, to operating positions in which the servomotor is connected to the accumulator and the reservoir; reaction force generating means for yieldably resisting displacement of the steering spindle, comprising a valve body (8) enclosing a pair of opposing reaction chambers (80 and 80A), a reaction piston assembly (10) movably mounted in the valve body and exposed to opposing pressures in said reaction chambers, and spring biased force limiting means (62 and 62A) movably mounted in the reaction piston assembly for connecting either one of the reaction chambers to the reservoir to limit the reaction force generated in response to displacement of the reaction piston assembly by the steering spindle.

2. The combination of claim 1, wherein said force limiting means includes a pair of piston valves (62 and 62A) having predetermined positions connecting the accumulator to the opposing reaction chambers, spring means (63) for biasing said piston valves to said predetermined positions against the bias of the pressures in said reaction chambers, and ported guide means (61 and 61A) mounting the piston valves within the reaction piston assembly to sequentially block flow from the accumulator to the reaction chambers and connect the same to the reservoir in response to displacement of the piston valves from the normal positions by excessive increase of pressure in the reaction chambers.

3. The combination of claim 2, wherein said ported guide means includes stop surfaces (64 and 64A) engageable by the piston valves in said predetermined positions.

4. The combination of claim 3, wherein said ported guide means further includes a pair of sleeves slidably mounting the piston valves, and a pin (82) connecting at least one of the sleeves (61A) to the valve assembly to facilitate disassembly therefrom.

5. The combination of claim 4 wherein said steering spindle (7) extends through the valve body (8) along a spindle axis, said reaction piston assembly (10) being mounted in the valve body in transverse spaced relation to the spindle axis.

6. The combination of claim 1 wherein said steering spindle (7) extends through the valve body (8) along a spindle axis, said reaction piston assembly (10) being mounted in the valve body in transverse spaced relation to the spindle axis.

* * * * *